United States Patent
Urie et al.

(10) Patent No.: US 6,683,696 B1
(45) Date of Patent: Jan. 27, 2004

(54) FILTER BASED DATA IMAGING METHOD FOR AN IMAGE FORMING DEVICE

(75) Inventors: Cooper G. Urie, Boise, ID (US); John L. Boldon, Boise, ID (US); Todd A. Fischer, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/181,033

(22) Filed: Oct. 27, 1998

(51) Int. Cl.[7] .............................. G06F 15/00; G06K 1/00
(52) U.S. Cl. ...................... 358/1.15; 358/1.13; 358/1.1; 358/3.27; 382/260; 382/261; 382/262; 707/103 R
(58) Field of Search ............................. 358/1.15, 1.13, 358/3.27, 1.1; 382/260, 261, 262; 707/103 R (56) References Cited

U.S. PATENT DOCUMENTS

| | | | |
|---|---|---|---|
| 5,444,826 A | | 8/1995 | Okada .......................... 395/112 |
| 5,664,075 A | * | 9/1997 | Park et al. ................... 358/1.15 |
| 5,696,850 A | * | 12/1997 | Parulski et al. .............. 382/261 |
| 5,819,015 A | * | 10/1998 | Martin et al. ................ 358/1.15 |
| 5,862,310 A | * | 1/1999 | Crawford et al. ........... 358/1.15 |
| 5,913,038 A | * | 6/1999 | Griffiths ...................... 709/231 |
| 5,933,584 A | * | 8/1999 | Maniwa ....................... 358/1.15 |
| 5,982,997 A | * | 11/1999 | Stone et al. ................. 358/1.15 |
| 5,999,710 A | * | 12/1999 | Smith et al. ................. 358/1.15 |
| 6,025,925 A | * | 2/2000 | Davidson, Jr. et al. ..... 358/1.15 |
| 6,031,625 A | * | 2/2000 | Sherman et al. ............ 358/1.15 |
| 6,175,839 B1 | * | 1/2001 | Takao et al. .................. 715/500 |
| 6,216,132 B1 | * | 4/2001 | Chandra et al. ......... 707/103 R |
| 6,246,485 B1 | * | 6/2001 | Brown et al. ............... 358/1.13 |
| 6,249,610 B1 | * | 6/2001 | Matsumoto et al. ......... 382/232 |
| 6,266,150 B1 | * | 7/2001 | Brossman et al. .......... 358/1.15 |
| 6,292,267 B1 | * | 9/2001 | Mori et al. .................. 358/1.15 |
| 6,337,743 B1 | * | 1/2002 | Brown et al. ............... 358/1.13 |
| 6,389,163 B1 | * | 5/2002 | Jodoin et al. ................ 382/173 |

FOREIGN PATENT DOCUMENTS

| | | |
|---|---|---|
| EP | 0564159 A2 | 10/1993 |
| EP | 0585522 A1 | 3/1994 |
| EP | 0702289 A1 | 3/1996 |
| EP | 0727732 A1 | 8/1996 |
| WO | WO92/04672 | 3/1992 |

* cited by examiner

*Primary Examiner*—Kimberly A. Williams
*Assistant Examiner*—Ashanti Ghee (57) ABSTRACT

The present invention includes data imaging methods and image forming devices. One aspect of the present invention provides a data imaging method including the steps of providing an image forming device including a filter interface; communicating at least one data stream within the image forming device; adaptively interfacing a filter with the filter interface of the image forming device; accessing at least one data stream using the filter following the interfacing; and forming an image following the accessing.

30 Claims, 8 Drawing Sheets

FILTER BASED DATA IMAGING METHOD FOR AN IMAGE FORMING DEVICE

FIELD OF THE INVENTION

The present invention relates to a data imaging method and an image forming device.

BACKGROUND OF THE INVENTION

Conventional printers including ink jet and laser printers are typically coupled with a host computer system which is configured to interface with the appropriate printer. The host system usually downloads a print job to the printer via an input/output interface. Typical printers include firmware containing a set of instructions configured to parse the incoming data, rasterize the data and print an image.

Some conventional arrangements provide a page description language (PDL) driver within the host computer system. Exemplary page description languages include PCL and PostScript. The associated printer includes one or more parsers which are configured to operate in conjunction with the appropriate page description language drivers of the host computer system. The attached printer usually has plural page description language parsers for use with multiple drivers. Following processing within the appropriate page description language parser, the received data is rasterized and applied to the print engine of the printer.

Figure 1:
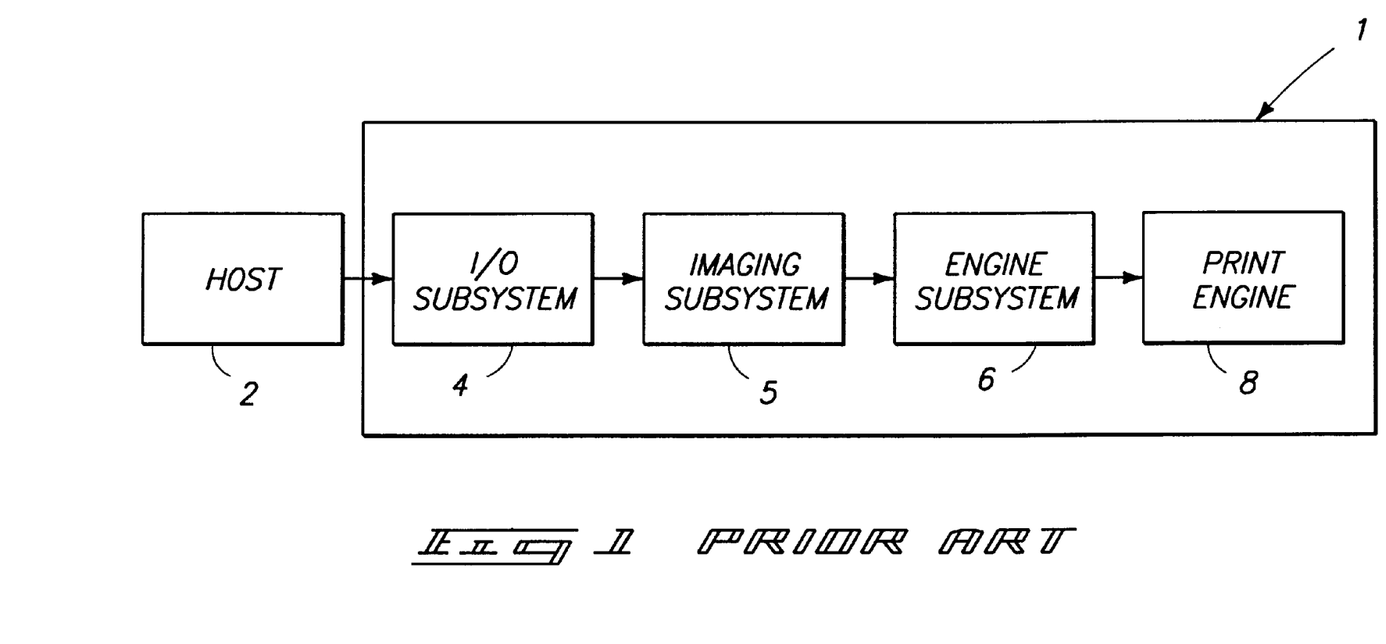
FIG. 1 is a functional block diagram illustrating subsystems of a conventional printer device arrangement.

Referring to FIG. 1, a functional illustration of firmware of a conventional printer 1 is depicted. The depicted firmware includes an I/O subsystem 4, imaging subsystem 5 and engine subsystem 6. I/O subsystem 4 is coupled with a host 2. Host 2 is configured to output a print job data stream to printer 1. Exemplary print job data streams comprise page description language (PDL) data.

I/O subsystem 4 accepts the print job data stream from host 2 and removes any I/O specific data from the data stream. I/O subsystem 4 thereafter presents the data stream to imaging subsystem 5. Imaging subsystem 5 is operable to convert the data, which is typically in the form of a sequence of instructions describing how marks should be made on a page, into a rasterized representation of the page to be printed. Imaging subsystem 5 typically comprises a parser and rasterizer to provide such conversion operations of the data stream. The rasterized data is outputted from imaging subsystem 5 and presented to engine subsystem 6.

Engine subsystem 6 receives the rasterized data from imaging subsystem 5 and interfaces with print engine 8. Engine subsystem 6 communicates with the laser or other printing device hardware of print engine 8. Print engine 8 is configured to place marks on the media during printing.

The previously described subsystem printer operations are typically implemented within firmware of the printer. The firmware is provided within various read only memory (ROM) storage devices in many conventional devices. Accordingly, some conventional printer arrangements are relatively inflexible and do not easily accommodate changes within imaging technology or additional applications.

Therefore, a need exists to provide improved image forming devices and methodologies which overcome these shortcomings of the prior devices.

SUMMARY OF THE INVENTION

The present invention provides data imaging methods and image forming devices. One aspect of the present invention provides a data imaging method including the steps of providing an image forming device including a filter interface; communicating at least one data stream within the image forming device; adaptively interfacing a filter with the filter interface of the image forming device; accessing at least one data stream using the filter following the interfacing; and forming an image following the accessing.

A second aspect of the present invention provides an image forming device comprising: an interface device adapted to communicate a data stream; a filter interface coupled with the interface device and configured to communicate the data stream with the interface device, the filter interface being further configured to adaptively interface with at least one filter received within the image forming device, at least one filter being configured to access the data stream from the filter interface and output the data stream to the filter interface; and at least one storage device configured to receive and store the data stream.

Another aspect of the present invention provides an image forming device comprising: an interface device adapted to couple with a host and communicate at least one data stream with the host; a filter interface coupled with the interface device and configured to communicate the data stream with the interface device, the filter interface being further configured to adaptively interface with at least one filter received within the image forming device, at least one filter being configured to access the data stream from the filter interface and output the data stream to the filter interface, the filter interface and firmware individually being implemented in one of firmware and software; at least one storage device configured to receive and store the data stream and the filter; a processor configured to execute at least one of firmware instructions and software instructions and rasterize the data stream within at least one storage device; and a print engine configured to generate an image upon media according to the rasterized data stream.

DESCRIPTION OF THE DRAWINGS

Preferred embodiments of the invention are described below with reference to the following accompanying drawings.

DETAILED DESCRIPTION OF THE INVENTION

This disclosure of the invention is submitted in furtherance of the constitutional purposes of the U.S. Patent Laws "to promote the progress of science and useful arts" (Article 1, Section 8).

Figure 2:
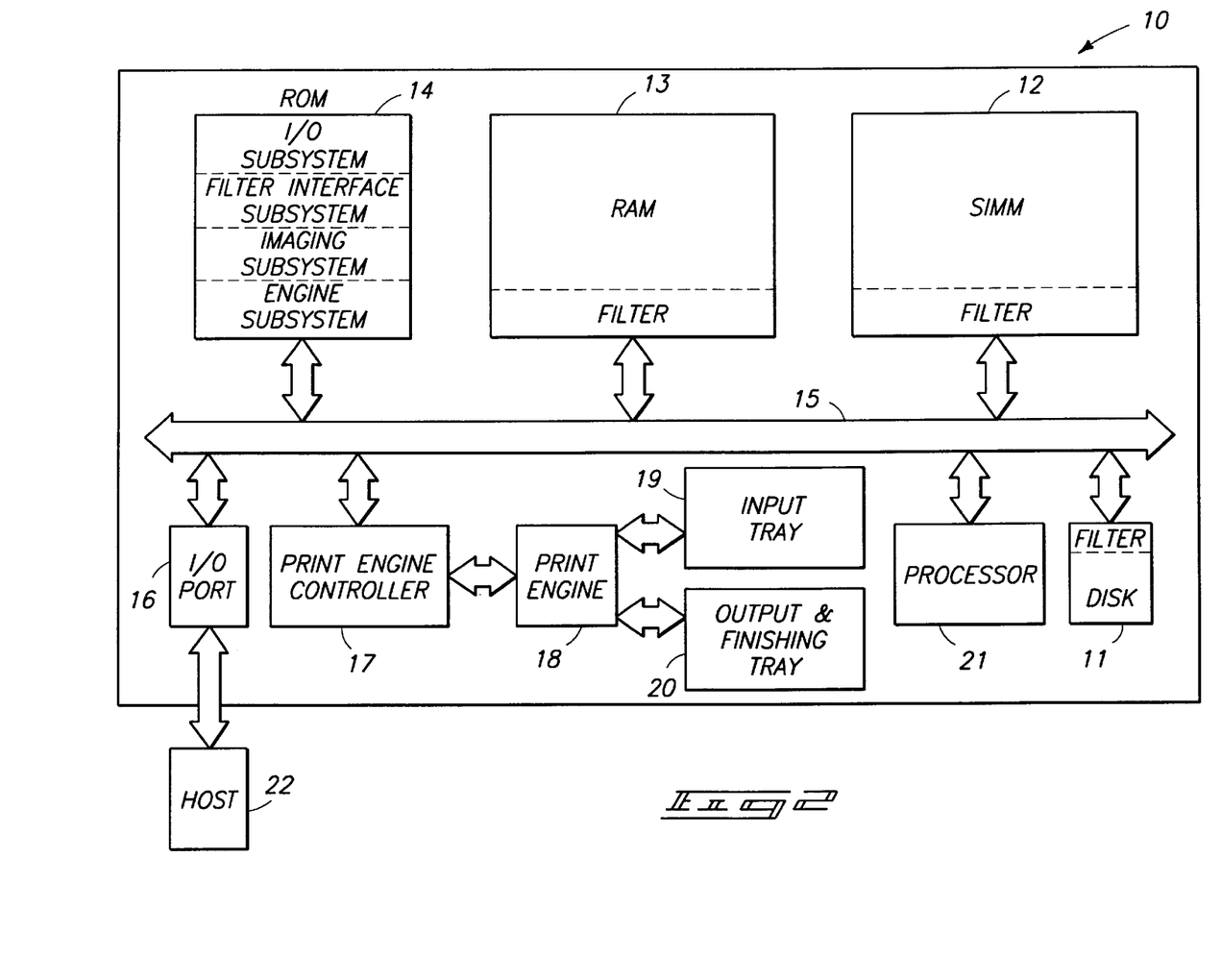
FIG. 2 is a functional block diagram illustrating hardware of an image forming device in accordance with one embodiment of the present invention.

Referring to FIG. 2, hardware of an exemplary image forming device 10 is illustrated. The present invention is described with reference to a printer image forming device. However, the present invention is not limited to the disclosed arrangement but is applicable to other image forming devices and peripheral devices including devices which are configured to communicate data with another system, such as a host computer. Exemplary alternative image forming devices include facsimiles, copiers, and multiple function peripheral devices.

The depicted embodiment of image forming device 10 comprises a plurality of storage devices including a hard disk drive storage device 11, single-in-line-memory module (SIMM) device 12, random access memory (RAM) device 13, and read only memory (ROM) device 14. Individual storage devices 12, 13, 14 are coupled with a bi-directional bus 15. Storage device 12 comprises a dual-in-line-memory module (DIMM) in another arrangement.

Additional hardware of the depicted image forming device 10 includes an input/output (I/O) port 16, print engine controller 17, print engine 18, input tray 19 and output and finishing tray 20. Image forming device 10 additionally includes a processor 21, such as a microprocessor, configured to control functions of image forming device 10. Processor 21 communicates with other hardware elements of image forming device 10 via bus 15.

I/O port 16 comprises one or more input/output devices adapted to couple with one or more hosts 22, such as a personal computer or network external to image forming device 10. I/O port 16 can comprise a parallel interface which provides communications between image forming device 10 and host 22. I/O port 16 receives page description language data (or raster data) from host 22 for processing within image forming device 10 in accordance with the described embodiment.

Print engine controller 17 and associated print engine 18 are coupled to bus 15 and provide print output capability for image forming device 10 in but one embodiment. Sheet media is pulled from input tray 19 into print engine 18 and subsequently directed to output and finishing tray 20. Output and finishing tray 20 includes, in an exemplary embodiment, finishing feature mechanisms such as sheet registration, binding, stapling, punching, and the like, and may include one or more bins for collation or "mailbox" usage purposes. Input tray 19 may also include a plurality of input trays for varied media selection.

According to the described embodiment, print engine 18 is a multi-resolution capable engine. For example, it can print, selectively, at 600 or 1200 dots per inch (dpi). For purposes of this disclosure, print engine 18 is a laser printer that employs an electrophotographic drum imaging system. Other image forming systems are utilized in other embodiments.

Random access memory (RAM) 13 provides main memory storage capabilities within image forming device 10 for storing and processing print job data streams received from host 22. Random access memory 13 can comprise dynamic random access memory (DRAM) in an exemplary embodiment. Read only memory (ROM) 14 contains firmware which controls the operation of processor 21 and image forming device 10. Exemplary firmware code procedure stored in ROM 14 includes an input/output (I/O) subsystem, a filter interface subsystem, an imaging subsystem and an engine subsystem.

The I/O subsystem is operable to accept inbound data received from I/O port 16 and prepare outbound data for communication via I/O port 16. The I/O subsystem is configured to strip I/O specific data from the received data and pass the remaining data (e.g., page description language) to the filter interface subsystem.

The filter interface subsystem provides an interface with which one or more filters which can be dynamically installed or uninstalled in accordance with the present invention and as described in detail herein. Such "dynamic" installation of filters includes installation prior to boot-up of image forming device 10 as well as installation during operation (e.g., printing) of image forming device 10. Further, installed filters can be dynamically uninstalled prior to boot-up or during operation of image forming device 10.

Installed and registered filters are configured to access inputted and outputted data passing through the filter interface subsystem intermediate the I/O subsystem and the imaging subsystem. Individual filters may be configured for specific and different applications. For example, filters can be provided to selectively monitor the data (e.g., record the number of occurrences of a particular character within the data) or modify the data (e.g., provide selective encryption/decryption operations of the data). Selected filters may be configured to automatically terminate following the performance of a predefined task. Further details of the filters are described in detail below with reference to FIG. 4–FIG. 8.

Figure 3:
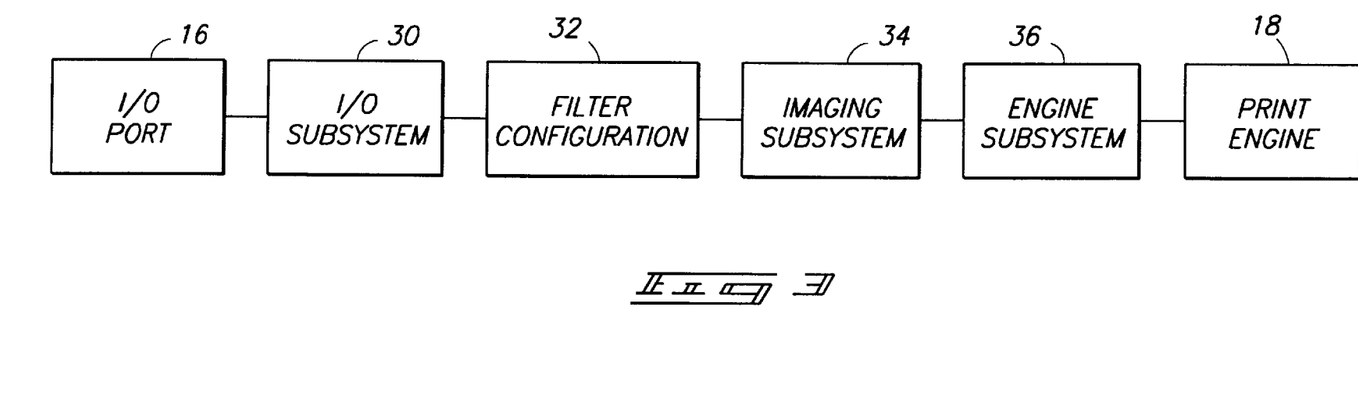
FIG. 3 is a functional block diagram illustrating flow of a print job data stream within the image forming device.

Referring to FIG. 3, interconnections of internal components of image forming device 10 are shown. In particular, the described embodiment of image forming device 10 includes an I/O subsystem 30, a filter configuration 32, an imaging subsystem 34 and an engine subsystem 36. As mentioned above, I/O subsystem 30, imaging subsystem 34 and engine subsystem 36 can be implemented within firmware. Firmware also includes the filter interface subsystem described in detail below. Other configurations of image forming device 10 are possible. Preferred embodiments of image forming device 10 provide bi-directional data flow within I/O port 16. Filter configuration 32 is ideally configured to access data received by I/O port 16 from an external device, or data to be outputted by I/O port 16 to an external device. The external device can comprise a computer, another image forming device, etc.

In general, the operation of image forming device 10 commences responsive to the reception of page description data from host 22 via I/O port 16 in the form of a print job data stream. The page description is initially placed in RAM storage device 13. Processor 21 accesses the page description language and performs initial operations specified by registered filters, if any. Thereafter, processor 21 builds a display command list using the imaging system.

More specifically, I/O subsystem 30 is configured to receive a print job data stream from I/O port 16. I/O subsystem 30 performs I/O specific operations upon the received print job data stream and applies the print data to filter configuration 32. Filter configuration 32 accesses data and can selectively modify the data. Either modified or unmodified data is outputted from filter configuration 32 and applied to imaging subsystem 34, or alternatively to I/O subsystem 30 depending upon the direction of data flow within image forming device 10.

Imaging subsystem 34 contains a parser and rasterizer configured to respectively parse and rasterize a data stream to be printed. In particular, imaging subsystem 34 is configured in the described configuration to convert page description language data received from host 22 to a display command list. Individual display commands define an object to be printed on a page. Imaging subsystem 34 includes rasterizer firmware configured to convert individual display commands to an appropriate bit map (rasterized strip) and distribute the bit map into RAM storage device 13. Compression firmware may be provided to compress the rasterized strips in the event insufficient memory exists in RAM 13 for holding the rasterized strips.

The rasterized data may be retrieved from RAM storage device 13 by engine subsystem 36. Engine subsystem 36 interfaces with print engine 18 to provide the rasterized data upon the media. Rasterized strips of data are passed to print engine 18 by print engine controller 17 thereby enabling the generation of an image (i.e., text, graphics, etc.) when a page is closed for processing (i.e., all strips have been evaluated, rasterized, compressed, etc.). Engine subsystem 36 controls the sequencing and transferring of page strips to print engine controller 17. Engine subsystem 36 additionally controls the operation of print engine controller 17 and print engine 18.

Figure 4:
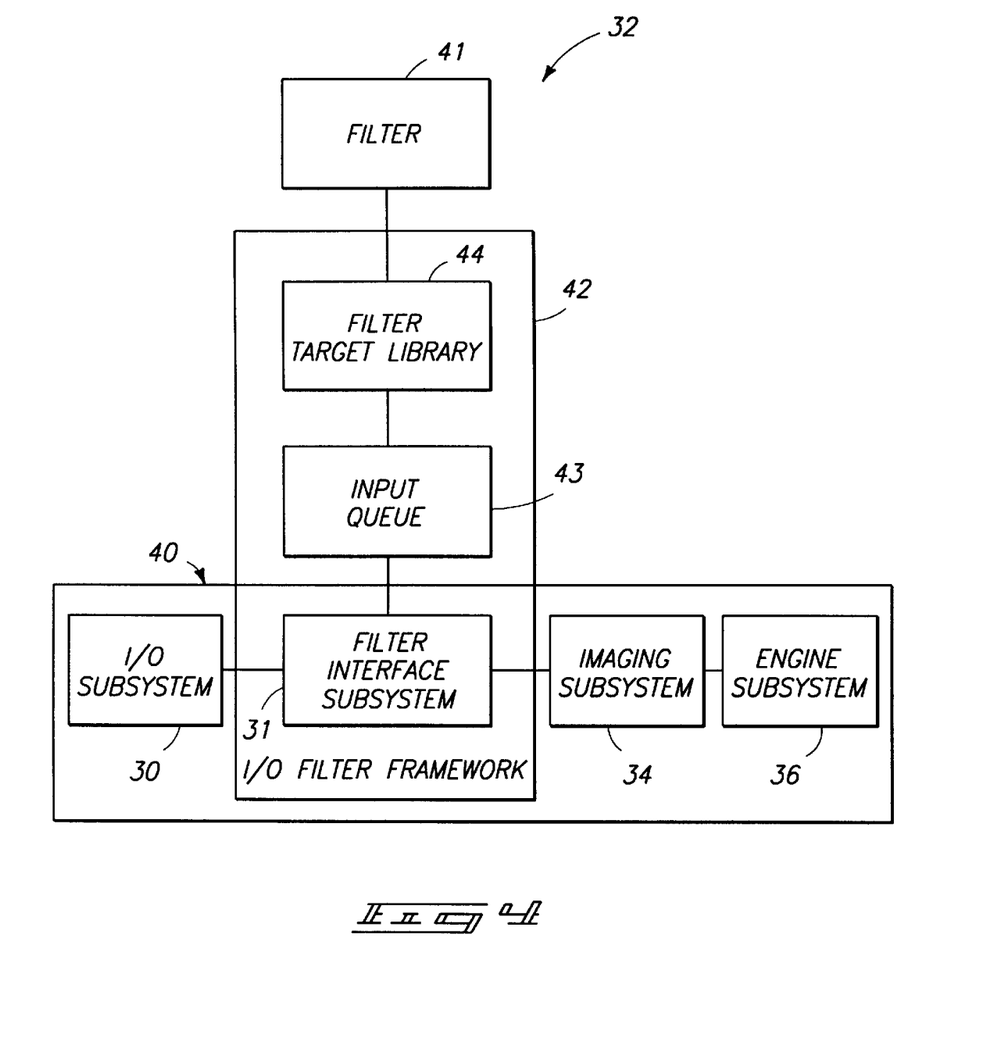
FIG. 4 is a functional block diagram illustrating a filter configuration of the image forming device according to one embodiment of the present invention.

Referring to FIG. 4, details regarding interfacing of firmware 40 of image forming device 10 and an exemplary filter 41 are shown. As described in detail below, one or more filters 41 may be dynamically installed or uninstalled within image forming device 10. Filter 41 may be implemented using an application programming interface (API) toolkit in certain embodiments. Individual filters 41 are provided to access and selectively manipulate the data in the described operation. Exemplary functions of filter 41 include performing encryption or decryption operations upon the print job data stream, monitoring metrics within the print job data stream, converting PDL data from one format to another (e.g., IPDS to PCL), monitoring CRC data, echoing the received data to the sender, implementing performance testing wherein test data received is consumed by the filter, parsing received data streams, or other desired operations.

Components described herein implemented in firmware may also be implemented in software. In particular, individual components of filter configuration 32 can be implemented as software or firmware.

In the described configuration, I/O subsystem 30, filter interface subsystem 31, imaging subsystem 34 and engine subsystem 36 are implemented within firmware 40 of image forming device 10. The depicted firmware 40 is provided within ROM storage device 14 in the described embodiment. Portions of filter 41, or the entire filter 41, may be implemented in firmware in some embodiments. In addition, the entire filter configuration 32 may be implemented in firmware.

The depicted filter configuration 32 comprises an input/output filter framework 42 which includes filter interface subsystem 31, input queue 43 and a filter target library 44. Filter interface subsystem 31, also referred to as filter interface, contains functions called by one or more filters enabling the filters to receive incoming data and send outgoing data to either the next filter, imaging subsystem 34 or I/O subsystem 30. Filter interface subsystem 31 may be also referred to as a core library of image forming device 10.

Input queue 43 provides memory to temporarily store data to be accessed by filter 41. Filter target library 44 is associated with a respective filter 41 and may be installed and/or uninstalled along with filter 41. Filter target library 44 permits filter 41 to access functions enabling reception of incoming data from filter interface subsystem 31 and send outgoing data to another filter and/or filter interface subsystem 31.

According to the described embodiment, individual filters 41 are provided to image forming device 10 in a relocatable object module format. Filter target library 44 is preferably modeled after ANSI stream functions. Filter target library 44 provides access to individual functions of the corresponding filter 41 and coordinates buffer handling with filter interface subsystem 31.

The image forming device of the present invention is preferably configured for dynamic installation of at least one filter 41. One or more filters may be utilized depending upon the particular application of the image forming device. Further, the filters may be installed prior to boot-up cycles of the image forming device or during operation of the image forming device. One or more filters may also be dynamically uninstalled prior to boot-up of the image forming device or during operation of the image forming device to free resources within the image forming device, such as memory and processing time of processor 21. Filter interface subsystem 31 is configured to adaptively interface with received filters providing dynamic installation or uninstallation of received filters.

Inasmuch as filters 41 may be dynamically installed or uninstalled, the number of filters present within image forming device 10 at any given time may vary. Individual filters 41 perform their respective intended operations upon the data passing through filter interface subsystem 31 independent of the imaging subsystem 34. In some situations, it is possible that either one or all of the filter configurations 32 completely consume the data passing nothing to I/O subsystem 31 or imaging subsystem 34 depending upon the direction of data flow.

Figure 5:
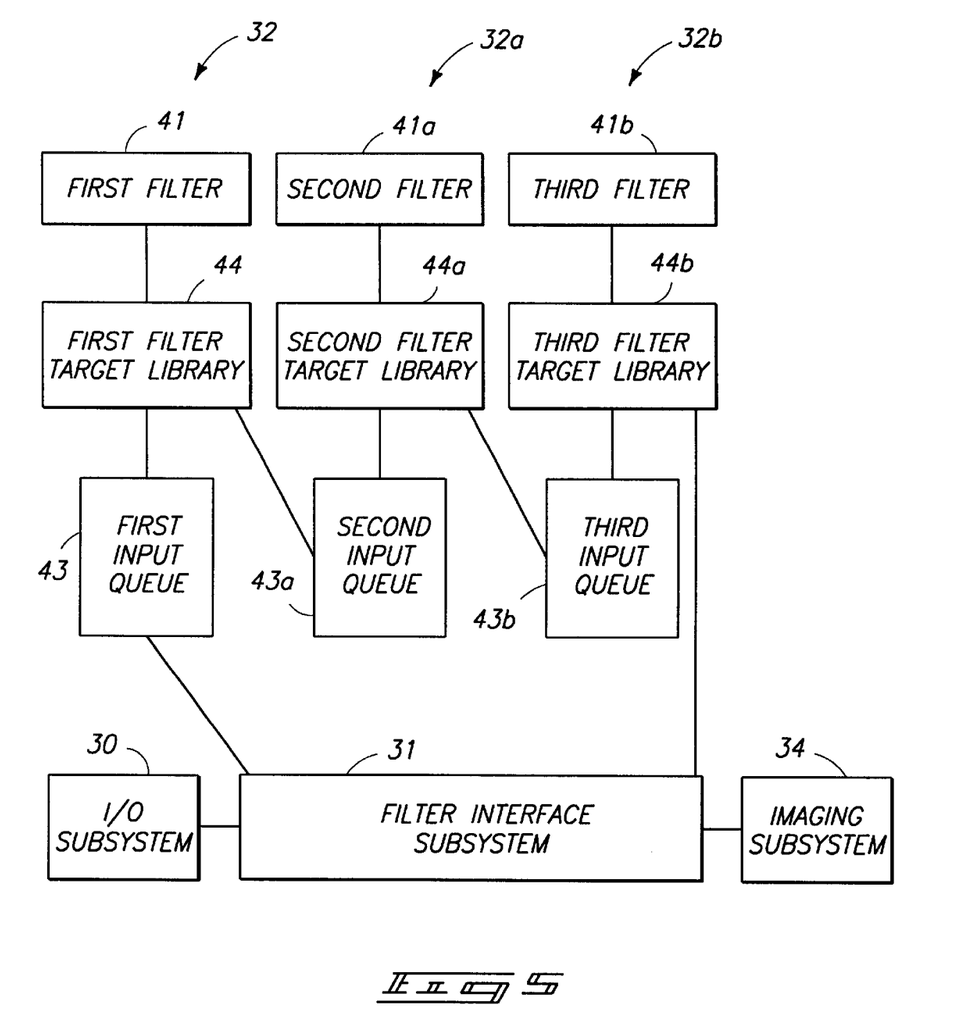
FIG. 5 is a functional block diagram illustrating one arrangement of a plurality of filter configurations interfacing with subsystems of the image forming device.

Referring to FIG. 5, plural filter configurations 32, 32a and 32b are shown installed and registered with filter interface subsystem 31 of the image forming device and include respective filters 41, 41a, 41b respective target libraries 44, 44a, 44b, and respective input queues 43, 43a, 43b. FIG. 5 illustrates data flow intermediate I/O subsystem 30, filter interface subsystem 31, imaging subsystem 34, and within registered filter configurations 32, 32a, 32b.

Data received within filter interface subsystem 31 from I/O subsystem 30 is provided within first input queue 43. Input queues 43, 43a, 43b individually hold data that is waiting to be processed by respective filters 41, 41a, 41b. Once a respective filter 41, 41a, 41b requests the data, the data is removed from the corresponding input queue 43, 43a, 43b and passed to the respective filter for processing.

If a plurality of filters are registered within the image forming device, output of first filter configuration 41 may be passed to second filter 41a and third filter 41b for selective processing of the data. Thereafter, the data is passed to imaging subsystem 34. In particular, an individual filter (e.g., first filter 41 shown in FIG. 5) can be configured to provide the data to be outputted on the input queue (e.g., second input queue 43a) of the next filter. The last filter (e.g., third filter 41b) outputs the data to filter interface subsystem 31 for application to imaging subsystem 34. Plural filters 41, 41a, 41b preferably operate independently of one another as well as independent of the particular operating environment (e.g., UNIX, PC, etc.).

The number of filter configurations 32 shown in FIG. 5 is exemplary inasmuch as there is no constraint upon the number of filters 41 which may be actively running within image forming device 10 at any given time. In arrangements or operational situations wherein plural filters 41 are provided intermediate I/O subsystem 30 and imaging subsystem 34, image forming device 10 may be configured to perform precedence operations. Precedence operations are utilized to determine whether a newly received filter can be registered. Further, the precedence operations assign a particular order for plural filters intermediate I/O subsystem 30 and imaging subsystem 34. One exemplary precedence operation methodology is described below with reference to FIG. 8.

Figure 6:
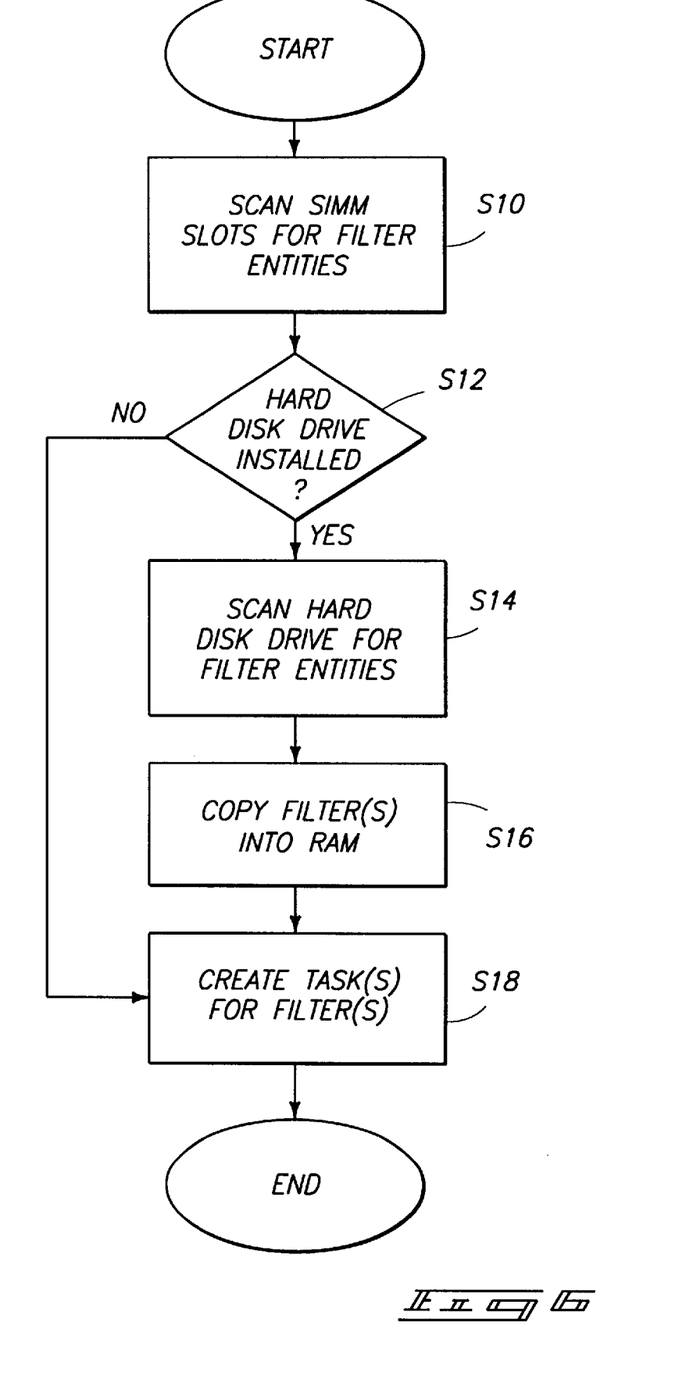
FIG. 6 is a flowchart illustrating one exemplary method of installing a filter within the image forming device during a boot-up operation.
Figure 7:
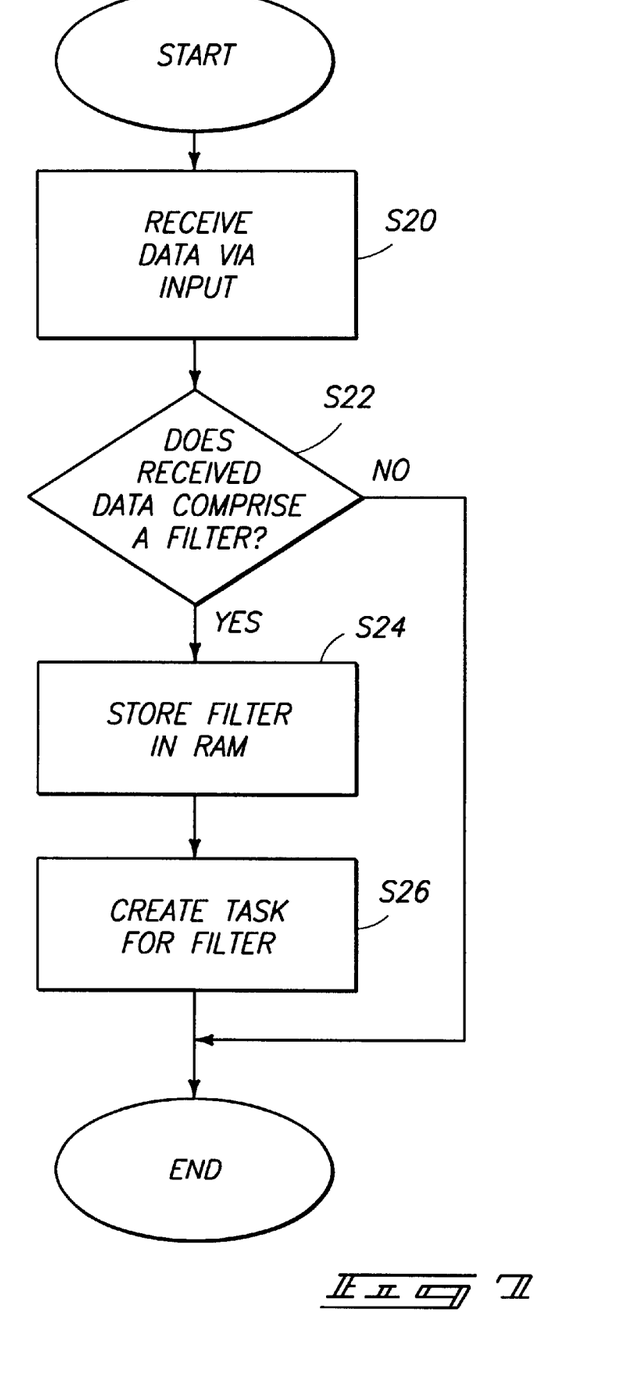
FIG. 7 is a flowchart illustrating one exemplary method of installing a filter within the image forming device during operation of the image forming device.

Referring to FIG. 6 and FIG. 7, exemplary dynamic installation methodologies of filters 41 within image forming device 10 are described. In particular, the flow chart of FIG. 6 describes an exemplary methodology for implementing dynamic installation of filters during a boot-up cycle of image forming device 10. FIG. 7 illustrates one exemplary methodology for providing dynamic installation of a filter during operation of image forming device 10.

Referring specifically to FIG. 6, filters can be dynamically loaded into image forming device 10 utilizing SIMM module 12, hard disk drive 11 or another storage device prior to the initiation of a boot-up cycle of image forming device 10. SIMM modules 12 containing at least one filter can be plugged into appropriate SIMM slots prior to a boot-up cycle for installation of one or more filter(s). Processor 21 is configured to execute filter instructions directly from the appropriate SIMM module 12 in the described configuration. Alternatively, the filter instructions may be copied from SIMM module 12 into RAM 13 for execution.

Filters may be stored upon hard disk drive 11 for use within image forming device 10 in accordance with another aspect of the present invention. In one such configuration, host 22 is configured to download filters via I/O port 16 and bus 15 for storage upon hard disk drive 11. During operation, the filter resident upon hard disk drive 11 is copied into RAM 13 for execution.

Referring to the depicted flowchart, initially at step S10, processor 21 scans the SIMM slots and modules 12 for filter entities. As previously stated, processor 21 can execute filter instructions (if any) directly from the appropriate SIMM module 12 or copy the filter instructions into RAM 13.

Thereafter, processor 21 proceeds to step S12 to ascertain whether image forming device 10 includes a hard disk drive storage device. If a hard disk drive is located at step S12, processor 21 proceeds to step S14 and scans the located hard disk drive 11 for filter entities. Any filter entities are copied into RAM 13 at step S16 for proper operation of the filter. Thereafter, processor 21 proceeds to step S18 to create individual tasks for the respective filters. If at step S12, processor 21 does not locate the presence of a hard disk drive, processor 21 proceeds to step S18 directly to create tasks for filters found within associated SIMM modules 12 during execution of step S10.

Referring to FIG. 7, filters may be dynamically installed during operation of image forming device 10. One methodology for installing a filter during operation of image forming device 10 includes downloading filter code with other data via input 16. At step S20 of the depicted flow chart, processor 21 monitors for reception of data via input 16. At step S22, processor 21 determines whether the received data comprises a filter. At step S22, processor 21 proceeds to the end of the flowchart if the received input data does not comprise a filter. The flow chart procedure may be repeated when new data is received via input 16.

Alternatively, processor 21 proceeds to step S24 if the received data comprises a filter. The received filter is stored with RAM 13 at step S24 for subsequent execution of the filter code. Thereafter, processor 21 proceeds to step S26 to create a task for the filter. During step S26, the filter is allocated memory and stack space. Further, the filter is permitted to run as a separate task within image forming device 10. The filter is provided control of processor 21 at allocated times and instructions of the filter are executed independent of the remaining components of image forming device 10. The above-described procedure of step S26 may also be performed at step S18 of the flow chart of FIG. 6.

Following the creation of a task for an appropriate filter at step S18 or step S26, processor 21 preferably proceeds to run a precedence operation, provided by filter target library 44, to determine whether the filter may be subsequently registered within the image forming device.

Figure 8:
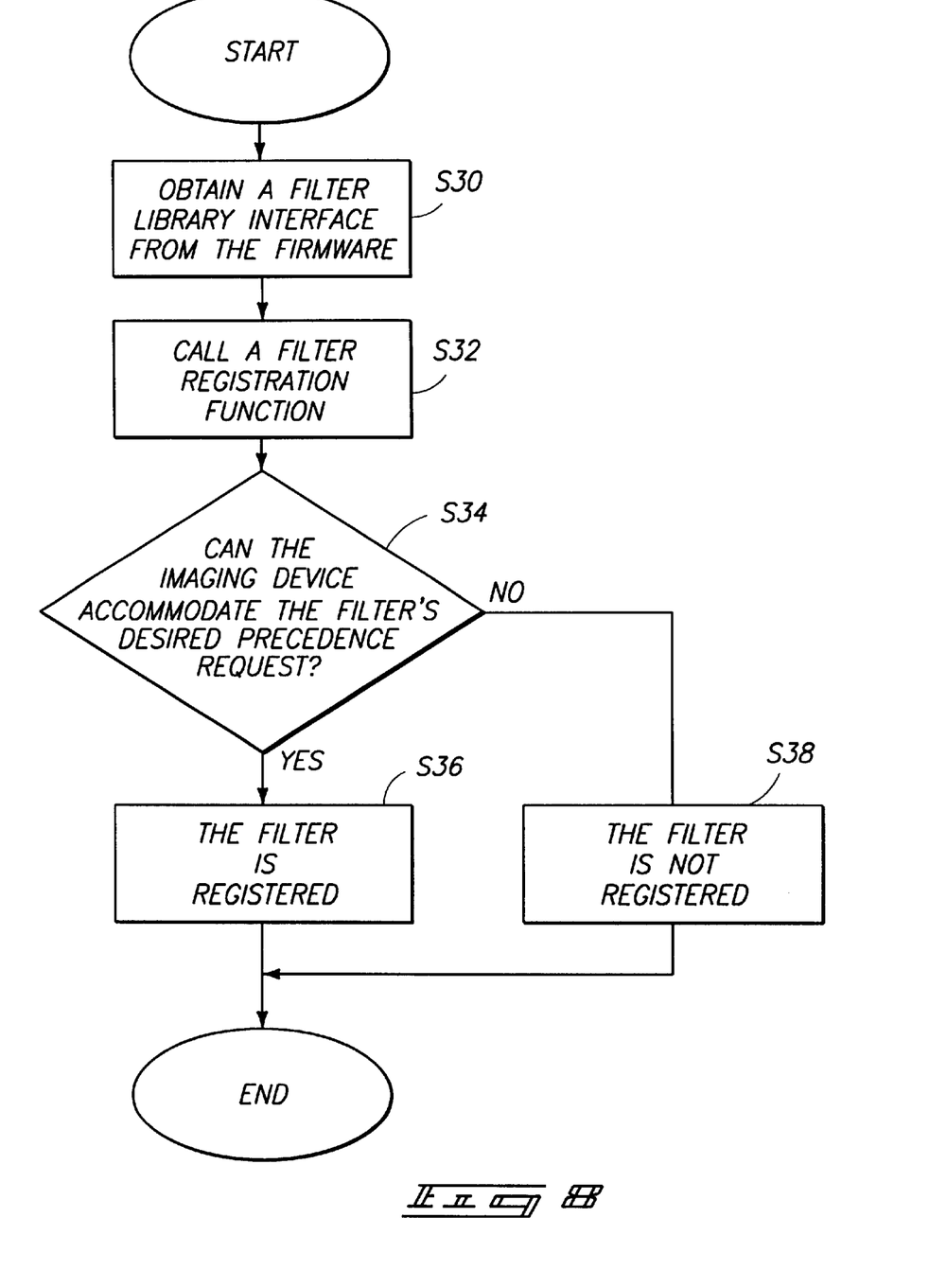
FIG. 8 is a flow chart illustrating one exemplary method of specifying precedence for a printer received within the image forming device.

Referring to FIG. 8, one methodology for determining precedence of individual filters received within image forming device 10 is described. Initially at step S30, processor 21 obtains a location of the filter interface subsystem from associated firmware of the image forming device. At step S32, a filter registration function is called by processor 21 to initiate a determination of whether the received filter may be registered.

In particular, it is determined at step S34 whether the image forming device can accommodate the filter's desired precedence request. An individual filter may request a position relative to other installed and registered filters. The registration function residing in the filter interface subsystem firmware of the image forming device determines the number of other filters currently installed and the resources of the image forming device. If a conflict would not be created, the filter is registered at a desired location at step S36 and operable to access data from filter interface subsystem 31 during operation of image forming device 10.

If a conflict with other currently registered filters would result from the registration of the new filter, or for other user specified reasons, the registration function denies the desired precedence request of the filter and the filter is not registered at step S38. It may be desired at step S38 for the unregistered filter to terminate and uninstall itself from the image forming device to free resources of the image forming device. Following the registration of a filter at step S36, the registered filter may similarly terminate or uninstall itself following the completion of its associated function to free resources of the image forming device.

Individual filters can be configured to access predefined data within data streams communicated within the filter interface. More specifically, an individual data stream can include job boundaries which identify the beginning and end of individual print jobs within the data stream. Individual filters can be provided to operate on selected print jobs. For example, filters can be configured to operate on data according to a specific type of page description language (e.g., a first filter may be configured to operate upon PCL data while another filter may be configured to operate upon PostScript data). As such, the filters are preferably individually configured to identify the type of print job (e.g., the particular page description language utilized) and determine whether or not to access the data. The filters can utilize job boundaries of the print jobs to identify the print job and determine whether or not to access the data identified by the job boundaries.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A data imaging method comprising:
providing an image forming device including a filter interface;
adaptively interfacing a filter comprising executable code with the filter interface of the image forming device, wherein the adaptively interfacing comprises interfacing during operation of the image forming device;
accessing at least one data stream using the filter following the interfacing; and
forming an image upon media using the image forming device following the accessing.

2. The method according to claim 1 further comprising receiving the filter within the image forming device.

3. The method according to claim 1 further comprising adaptively interfacing a plurality of filters with the filter interface.

4. The method according to claim 3 further including selectively registering the plurality of filters.

5. The method according to claim 1 wherein the accessing includes at least one of monitoring and manipulating the at least one data stream.

6. The method according to claim 1 further comprising adaptively decoupling the filter and the filter interface following the accessing.

7. The method according to claim 1 wherein the adaptively interfacing includes registering the filter.

8. The method according to claim 1 wherein the adaptively interfacing comprises interfacing prior to a boot-up operation of the image forming device.

9. A method according to claim 1 further comprising identifying data of the data streams and the accessing being responsive to the identifying.

10. A method according to claim 1 wherein the at least one data stream includes print job boundaries.

11. An image forming device comprising:
an interface device adapted to communicate a data stream;
a filter interface coupled with the interface device and configured to communicate the data stream with the interface device, the filter interface being further configured to adaptively interface with a plurality of filters received within the image forming device, at least one filter being configured to access the data stream from the filter interface and output the data stream to the filter interface;
at least one storage device configured to receive and store the data stream; and
an engine configured to generate an image upon media using the data stream.

12. The image forming device according to claim 11 wherein the at least one filter is configured to at least one of monitor and manipulate the data stream.

13. The image forming device according to claim 11 wherein the filter interface and the at least one filter are individually implemented in one of software and firmware.

14. The image forming device according to claim 13 further comprising a processor configured to execute at least one of software instructions and firmware instructions.

15. The image forming device according to claim 14 wherein the processor is configured to selectively register the at least one filter.

16. The image forming device according to claim 11 wherein the at least one storage device is configured to store the at least one filter.

17. The image forming device according to claim 11 wherein the at least one filter is adapted to adaptively decouple from the filter interface.

18. The image forming device according to claim 11 wherein the engine comprises a print engine configured to print an image from the data stream.

19. An image forming device comprising:
an interface device adapted to couple with a host and communicate at least one data stream with the host;
a filter interface coupled with the interface device and configured to communicate the data stream with the interface device, the filter interface being further configured to adaptively interface with at least one filter received within the image forming device, the at least one filter being configured to access the data stream from the filter interface and output the data stream to the filter interface, the filter and filter interface individually being implemented in one of firmware and software;
at least one storage device configured to receive and store the data stream and the filter;
a processor configured to execute at least one of firmware instructions and software instructions and rasterize the data stream stored within the at least one storage device; and
a print engine configured to print an image upon media according to the rasterized data stream.

20. A data imaging method comprising:
providing an image forming device including a filter interface;
adaptively interfacing a filter comprising executable code with the filter interface of the image forming device;
accessing at least one data stream using the filter following the interfacing;
forming an image following the accessing; and
adaptively decoupling the filter and the filter interface following the accessing.

21. A data imaging method comprising:
providing an image forming device including a filter interface;
adaptively interfacing a filter comprising executable code with the filter interface of the image forming device, wherein the adaptively interfacing includes registering the filter;
accessing at least one data stream using the filter following the interfacing; and
forming an image following the accessing.

22. A data imaging method comprising:
providing an image forming device including a filter interface;
adaptively interfacing a filter comprising executable code with the filter interface of the image forming device, wherein the adaptively interfacing comprises interfacing prior to a boot-up operation of the image forming device;
accessing at least one data stream using the filter following the interfacing; and
forming an image following the accessing.

23. A data imaging method comprising:
providing an image forming device including a filter interface;
adaptively interfacing a filter comprising executable code with the filter interface of the image forming device;

accessing at least one data stream using the filter following the interfacing, wherein the at least one data stream includes print job boundaries; and forming an image following the accessing.

24. An image forming device comprising:

an interface device adapted to communicate a data stream;

a filter interface coupled with the interface device and configured to communicate the data stream with the interface device, the filter interface being further configured to adaptively interface with at least one filter received within the image forming device, the at least one filter being configured to access the data stream from the filter interface and output the data stream to the filter interface;

at least one storage device configured to receive and store the data stream; and a processor configured to execute at least one of software instructions and firmware instructions, wherein the processor is configured to selectively register the filter.

25. An image forming device comprising:

an interface device adapted to communicate a data stream;

a filter interface coupled with the interface device and configured to communicate the data stream with the interface device, the filter interface being further configured to adaptively interface with at least one filter received within the image forming device, the at least one filter being configured to access the data stream from the filter interface and output the data stream to the filter interface, wherein the filter is adapted to adaptively decouple from the filter interface; and at least one storage device configured to receive and store the data stream.

26. A data imaging method comprising:

providing an image forming device including a filter interface;

receiving a filter within the image forming device;

adaptively interfacing the filter comprising executable code with the filter interface of the image forming device;

accessing at least one data stream using the filter following the interfacing; and forming an image upon media using the image forming device following the accessing.

27. A data imaging method comprising:

providing an image forming device including a filter interface;

adaptively interfacing a plurality of filters with the filter interface of the image forming device, wherein at least one of the filters comprises executable code;

accessing at least one data stream using the at least one filter following the interfacing; and forming an image upon media using the image forming device following the accessing.

28. The method of claim 27 further comprising selectively registering the plurality of filters.

29. A data imaging method comprising:

providing an image forming device including a filter interface;

adaptively interfacing a filter comprising executable code with the filter interface of the image forming device;

accessing at least one data stream using the filter following the interfacing;

forming an image upon media using the image forming device following the accessing; and wherein the at least one data stream includes print job boundaries.

30. An image forming device comprising:

an interface device adapted to communicate a data stream;

a filter interface coupled with the interface device and configured to communicate the data stream with the interface device, the filter interface being further configured to adaptively interface with at least one filter received within the image forming device, the at least one filter being configured to access the data stream from the filter interface and output the data stream to the filter interface;

at least one storage device configured to receive and store the data stream;

an engine configured to generate an image upon media using the data stream; and wherein the at least one storage device is configured to store the filter.

* * * * *